(12) United States Patent
Kalgaonkar

(10) Patent No.: US 10,655,057 B2
(45) Date of Patent: May 19, 2020

(54) METHODS AND MATERIALS FOR TREATING SUBTERRANEAN FORMATIONS USING A THREE-PHASE EMULSION BASED FRACTURING FLUID

(71) Applicant: Saudi Arabian Oil Company, Dhahran (SA)

(72) Inventor: Rajendra Arunkumar Kalgaonkar, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/794,715

(22) Filed: Oct. 26, 2017

(65) Prior Publication Data

US 2018/0327654 A1 Nov. 15, 2018

Related U.S. Application Data

(60) Provisional application No. 62/505,456, filed on May 12, 2017.

(51) Int. Cl.
*E21B 43/26* (2006.01)
*C09K 8/64* (2006.01)
(Continued)

(52) U.S. Cl.
CPC .................. *C09K 8/68* (2013.01); *C09K 8/64* (2013.01); *C09K 8/665* (2013.01); *C09K 8/70* (2013.01);
(Continued)

(58) Field of Classification Search
CPC . C09K 8/68; C09K 8/64; C09K 8/665; C09K 8/70; C09K 8/80; C09K 8/90; C09K 2208/14; C09K 2208/26; E21B 43/26
See application file for complete search history.

(56) References Cited

U.S. PATENT DOCUMENTS 3,006,880 A 10/1961 Schibler et al.
4,233,165 A 11/1980 Salathiel et al.
(Continued)

FOREIGN PATENT DOCUMENTS

GB 2022653 A 12/1979
WO 2016109348 A1 7/2016
WO 2017074326 A1 5/2017

OTHER PUBLICATIONS

International Search Report and Written Opinion for International Application No. PCT/US2018/03225 (SA5662); International Filing Date May 11, 2018; dated Jul. 20, 2018 (pp. 1-10).
(Continued)

*Primary Examiner* — Crystal J Miller
(74) *Attorney, Agent, or Firm* — Bracewell LLP; Constance G. Rhebergen; Brian H. Tompkins

(57) ABSTRACT

An emulsion for hydraulic fracturing to provide a one-step delivery of a fracturing fluid and a breaker for hydraulic fracturing of a hydrocarbon-bearing formation is provided. The emulsion for hydraulic fracturing is a water-in-oil-in-water emulsion having an internal aqueous phase that includes a breaker, an external aqueous phase that includes a fracturing fluid and a proppant, and an intermediate hydrocarbon phase separating the internal aqueous phase and external aqueous phase. The emulsion may include nanometer-sized or micrometer-sized particles to form a Pickering emulsion.

12 Claims, 2 Drawing Sheets

(51) Int. Cl.
*C09K 8/80* (2006.01)
*C09K 8/68* (2006.01)
*C09K 8/66* (2006.01)
*C09K 8/70* (2006.01)
*C09K 8/90* (2006.01)

(52) U.S. Cl.
CPC ............... *C09K 8/80* (2013.01); *C09K 8/90* (2013.01); *E21B 43/26* (2013.01); *C09K 2208/14* (2013.01); *C09K 2208/26* (2013.01)

(56) References Cited

U.S. PATENT DOCUMENTS

| | | | |
|---|---|---|---|
| 6,284,714 B1 | 9/2001 | Bland et al. | |
| 6,464,009 B2 | 10/2002 | Bland et al. | |
| 6,613,720 B1 | 9/2003 | Feraud et al. | |
| 7,281,581 B2* | 10/2007 | Nguyen | C09K 8/80 166/280.2 |
| 7,482,310 B1* | 1/2009 | Reese | C09K 8/64 166/270 |
| 8,444,993 B2* | 5/2013 | Huang | A61K 39/145 424/184.1 |
| 8,474,532 B2 | 7/2013 | Ballard | |
| 8,584,754 B1 | 11/2013 | Nguyen et al. | |
| 8,739,876 B2 | 6/2014 | Saini et al. | |
| 8,763,703 B2 | 7/2014 | Saini et al. | |
| 8,770,279 B2 | 7/2014 | Saini et al. | |
| 9,388,335 B2 | 7/2016 | Loiseau et al. | |
| 9,528,354 B2 | 12/2016 | Loiseau et al. | |
| 9,957,779 B2* | 5/2018 | Fursdon-Welsh | E21B 37/06 |
| 10,172,945 B2* | 1/2019 | Huang | A61K 47/34 |
| 2003/0017951 A1 | 1/2003 | Bland et al. | |
| 2007/0039733 A1 | 2/2007 | Welton et al. | |
| 2010/0161029 A1* | 6/2010 | Filippini | A61K 8/066 623/1.15 |
| 2011/0052633 A1* | 3/2011 | Huang | A61K 39/145 424/209.1 |
| 2012/0328654 A1* | 12/2012 | Huang | A61K 39/145 424/209.1 |
| 2014/0034320 A1 | 2/2014 | Ladva et al. | |
| 2014/0106992 A1* | 4/2014 | Patil | C09K 8/36 507/214 |
| 2014/0367100 A1* | 12/2014 | Oliveira | C09K 8/80 166/280.1 |
| 2015/0027699 A1* | 1/2015 | Loiseau | C09K 8/92 166/278 |
| 2015/0075790 A1* | 3/2015 | Loiseau | C09K 8/58 166/279 |
| 2015/0096750 A1* | 4/2015 | Loiseau | C09K 8/36 166/280.2 |
| 2015/0107835 A1* | 4/2015 | Panga | C09K 8/805 166/280.1 |
| 2015/0125498 A1* | 5/2015 | Dejmek | A23D 7/0053 424/401 |
| 2016/0024890 A1* | 1/2016 | Fursdon-Welsh | E21B 37/06 166/300 |
| 2016/0024891 A1* | 1/2016 | Fursdon-Welsh | E21B 37/06 166/300 |
| 2016/0312595 A1 | 10/2016 | Surjaatmadja et al. | |
| 2016/0319188 A1* | 11/2016 | Loiseau | C09K 8/92 |
| 2017/0015895 A1* | 1/2017 | Cox | C09K 8/03 |
| 2018/0008713 A1* | 1/2018 | Huang | A61K 9/113 |
| 2018/0112126 A1* | 4/2018 | Yang | C09K 8/565 |
| 2018/0298274 A1* | 10/2018 | Zhao | C09K 8/50 |
| 2018/0320059 A1* | 11/2018 | Cox | C09K 8/03 |

OTHER PUBLICATIONS

Ngai, et al.; "Novel Emulsions Stabilized by pH and Temperature sensitive Microgels" Royal Society of Chemistry, Chem. Commun., 2005, pp. 331-333.

* cited by examiner

METHODS AND MATERIALS FOR TREATING SUBTERRANEAN FORMATIONS USING A THREE-PHASE EMULSION BASED FRACTURING FLUID

CROSS-REFERENCE TO RELATED APPLICATIONS

This application claims priority from U.S. Provisional Application No. 62/505,456 filed May 12, 2017, and titled "METHODS AND MATERIALS FOR TREATING SUBTERRANEAN FORMATIONS USING A THREE-PHASE EMULSION BASED FRACTURING FLUID." For purposes of United States patent practice, this application incorporates the contents of the Provisional application by reference in its entirety.

BACKGROUND

Field of the Disclosure

The present disclosure generally relates to hydraulic fracturing for oil and gas wells. More specifically, embodiments of the disclosure relate to the delivery of a fracturing fluid and a breaker to a formation.

Description of the Related Art

Hydraulic fracturing (also referred to as "fracking") is used to stimulate production in hydrocarbon-containing formations by using materials to break ("fracture") a formation and release hydrocarbons such as oil and gas. After drilling a well, fracturing fluids such as water or chemicals may be injected into the well to reach a sufficient pressure to induce fractures in the formation. A fracturing fluid may contain proppants such as sand (referred to as "frac sand") or ceramic beads to hold open fractures created in the formation.

Fracturing fluid "cleanup" refers to the breaking down of components, such as a fracturing polymer, so that such components do not negatively affect production from a well. The chemical used to break down a fracturing fluid is referred to as a "breaker." However, use of breakers with fracturing fluids may be challenging, as activation of the breaker and breaking of the fracturing fluid should optimally occur after the fluid has placed all the proppant inside fractures. Early activation of the breaker may result in premature breaking of the fracturing fluid and may cause what is referred to as early proppant "screenout," that is, when the proppant bridges across a perforation or flow area and suddenly restricts flow, resulting in a rapid rise in pump pressure. Moreover, temperature increases in a well may also increase the difficulty of controlling the break time of a fracturing fluid.

SUMMARY

Embodiments of the disclosure include a three-phase emulsion for the one-step delivery of a fracturing fluid. The three-phase emulsion provides improved control over the breaking of the fracturing fluid to prevent premature breaking of the fracturing fluid before placing the proppant inside induced fractures.

In one embodiment, an emulsion for hydraulic fracturing of a formation is provided. The emulsion includes a first aqueous phase having a breaker and an ester, a second aqueous phase having a fracturing fluid and a proppant, and a hydrocarbon phase separating the first aqueous phase and second aqueous phase. The emulsion is a solid-stabilized emulsion stabilized by a plurality of polylactate particles. In some embodiments, the first aqueous phase and hydrocarbon phase are stabilized by a hydrophobic emulsifier. In some embodiments, the hydrophobic emulsifier includes sorbitan monooleate or polyethylene dipolyhydroxystearate. In some embodiments, the second aqueous phase and hydrocarbon phase are stabilized by a hydrophilic emulsifier. In some embodiments, the hydrophilic emulsifier includes a polysorbate, a nonylphenol ethoxylate, a seed oil-based surfactant, or a specialty alkoxylate. In some embodiments, the hydrocarbon phase is a fractional distillate of crude oil, a saturated hydrocarbon, an unsaturated hydrocarbon, a branched hydrocarbon, a cyclic hydrocarbon, a fatty derivative of an acid, an ester, an ether, an alcohol, an amine, an amide, or an imide, and any combination thereof. In some embodiments, the water of the first aqueous phase includes a brine having at least one inorganic salt. In some embodiments, the breaker of the first aqueous phase includes sodium chlorite, sodium hypochlorite, sodium bromate, sodium persulfate, ammonium persulfate, encapsulated sodium persulfate, potassium persulfate, ammonium persulfate, sodium peroxide, ammonium peroxide, or magnesium peroxide. In some embodiments, the water of the second aqueous phase includes a brine having at least one inorganic salt. In some embodiments, the fracturing fluid is guar, hydroxypropylguar, carboxymethylhydroxypropylguar, carboxymethylguar, carboxymethylcellulose, carboxymethylhydroxyethylcellulose, and any combination thereof. In some embodiments, the emulsion has an oil-water ratio (OWR) in the range of 10:90 to 40:60. In some embodiments, the emulsion has a viscosity in the range of 15 centipoise (cP) to 50 cP at 511 inverse seconds ($s^{-1}$) at 77° F. In some embodiments, the emulsion has a viscosity of at least 19 cP for at least 6 hours at a temperature of 200° F. In some embodiments, the emulsion is intact for at least 6 hours at a temperature of 200° F. In some embodiments, each of the plurality of polylactate particles have a diameter in the range of 1 micrometer (μm) to 100 micrometers.

In another embodiment, a method of forming a water-in-oil-in-water emulsion for hydraulic fracturing of a formation is provided. The method includes combining a water-in-oil emulsion and an oil-in-water emulsion to form the water-in-oil-in-water emulsion. The water-in-oil emulsion includes an internal phase having water, a breaker, and an ester, an external phase having a hydrocarbon, and a hydrophobic emulsifier. The oil-in-water emulsion includes an internal phase having the water-in-oil emulsion, an external phase having water, a fracturing fluid, and a proppant, a hydrophobic emulsifier, and a plurality of polylactate particles, such that the water-in-oil-in-water emulsion is a solid-stabilized emulsion. In some embodiments, the method includes preparing the water-in-oil emulsion. In some embodiments, the method includes preparing the oil-in-water emulsion. In some embodiments, the hydrophobic emulsifier includes sorbitan monooleate or polyethylene dipolyhydroxystearate. In some embodiments, the hydrophilic emulsifier includes a polysorbate, a nonylphenol ethoxylate, a seed oil-based surfactant, or a specialty alkoxylate. In some embodiments, the hydrocarbon is a fractional distillate of crude oil, a saturated hydrocarbon, an unsaturated hydrocarbon, a branched hydrocarbon, a cyclic hydrocarbon, a fatty derivative of an acid, an ester, an ether, an alcohol, an amine, an amide, or an imide, and any combination thereof. In some embodiments, the breaker of the first aqueous phase includes sodium chlorite, sodium hypochlorite, sodium bromate, sodium persulfate, ammonium persulfate, encapsulated sodium persulfate, potassium persulfate, ammonium persulfate, sodium peroxide, ammonium peroxide, or magnesium peroxide. In some embodiments, the fracturing fluid is guar, hydroxypropylguar, carboxymethylhydroxypropylguar, carboxymethylguar, carboxymethylcellulose, carboxymethylhydroxy-ethylcellulose, and any combination thereof.

In another embodiment, hydraulic fracturing a formation is provided. The method includes introducing an emulsion to a target zone in a formation, the emulsion including a first aqueous phase having a breaker and an ester, a second aqueous phase having a fracturing fluid and a proppant, and a hydrocarbon phase separating the first aqueous phase and second aqueous phase. The emulsion is a solid-stabilized emulsion stabilized by a plurality of polylactate particles. In some embodiments, the target zone of the formation has a temperature in the range of 150° F. to 300° F. In some embodiments, the emulsion is introduced as a fluid pill. In some embodiments, the first aqueous phase and hydrocarbon phase are stabilized by a hydrophobic emulsifier. In some embodiments, the hydrophobic emulsifier includes sorbitan monooleate or polyethylene dipolyhydroxystearate. In some embodiments, the second aqueous phase and hydrocarbon phase are stabilized by a hydrophilic emulsifier. In some embodiments, the hydrophilic emulsifier includes a polysorbate, a nonylphenol ethoxylate, a seed oil-based surfactant, or a specialty alkoxylate. In some embodiments, the hydrocarbon phase is a fractional distillate of crude oil, a saturated hydrocarbon, an unsaturated hydrocarbon, a branched hydrocarbon, a cyclic hydrocarbon, a fatty derivative of an acid, an ester, an ether, an alcohol, an amine, an amide, or an imide, and any combination thereof. In some embodiments, the breaker of the first aqueous phase includes sodium chlorite, sodium hypochlorite, sodium bromate, sodium persulfate, ammonium persulfate, encapsulated sodium persulfate, potassium persulfate, ammonium persulfate, sodium peroxide, ammonium peroxide, or magnesium peroxide. In some embodiments, the fracturing fluid is guar, hydroxypropylguar, carboxymethylhydroxypropylguar, carboxymethylguar, carboxymethylcellulose, carboxymethylhydroxy-ethylcellulose, and any combination thereof. In some embodiments, each of the plurality of polylactate particles have a diameter in the range of 1 micrometer (μm) to 100 micrometers.

DETAILED DESCRIPTION

Figure 1:
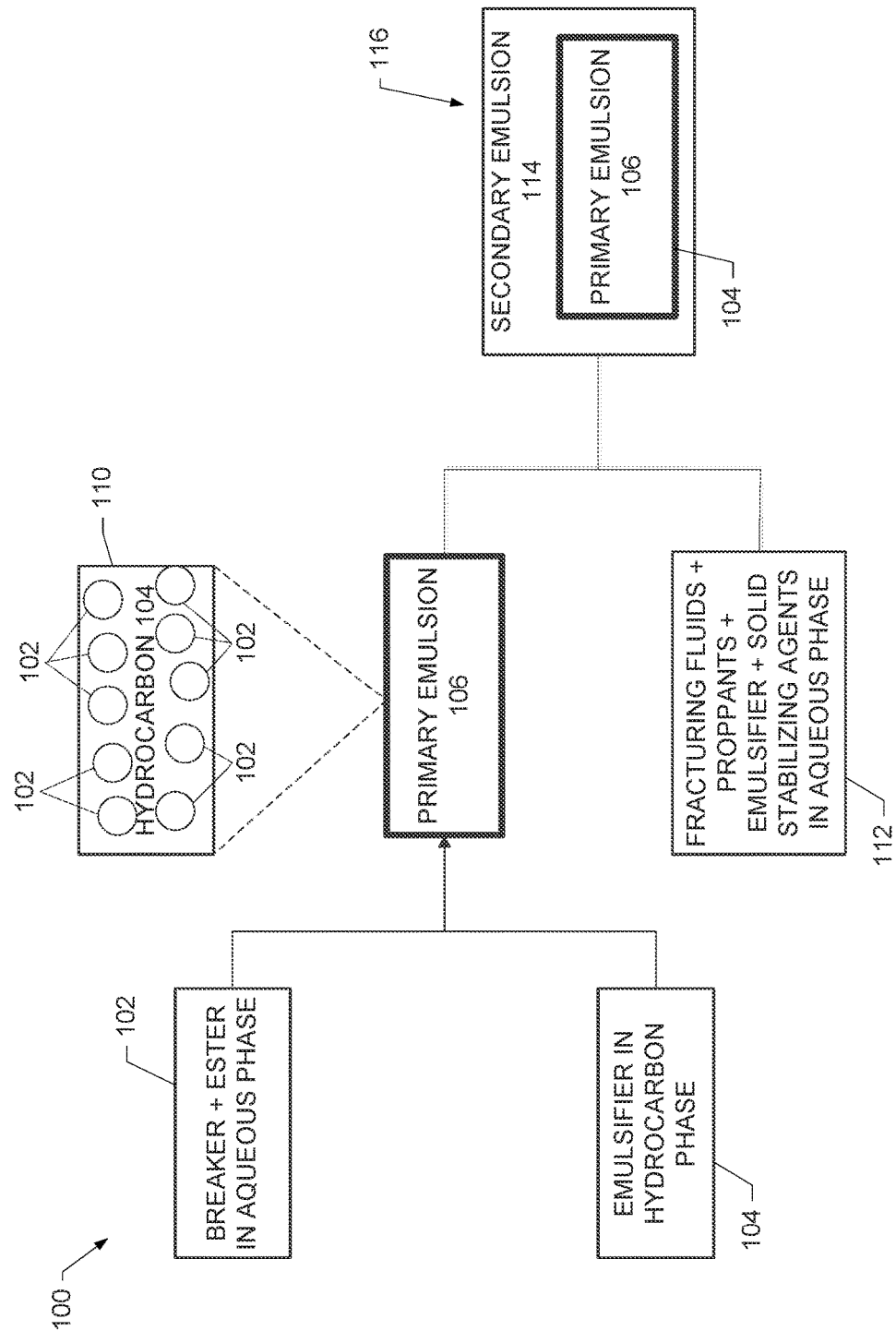
FIG. 1 is a schematic diagram of the components and formation of a three-phase emulsion in accordance with embodiments of the disclosure.

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

As used in the disclosure, "in situ" refers to an event or occurrence within a hydrocarbon reservoir including but not limited to methodologies, techniques and chemical reactions for enhancing hydrocarbon recovery from hydrocarbon reservoirs.

Embodiments of the disclosure include a three-phase emulsion to provide a one-step delivery of a fracturing fluid and a breaker for hydraulic fracturing of a hydrocarbon-bearing formation. The three-phase emulsion for hydraulic fracturing provides for the delivery of the fracturing fluid and the breaker without premature breaking of the fracturing fluid that may result in early proppant screenout. As described in the disclosure, the three-phase emulsion provides two control mechanisms to delay breaking of the fracturing fluid: 1) separation of the fracturing fluid and breaker in separate aqueous phases of the emulsion, and 2) in situ transition from a basic pH to an acidic pH to facilitate breaking of the emulsion over a time period.

The three-phase emulsion for hydraulic fracturing is a water-in-oil-in-water (w/o/w) emulsion having an internal aqueous phase that includes a breaker, an external aqueous phase that includes a fracturing fluid and a proppant, and an intermediate hydrocarbon phase separating the internal aqueous phase and external aqueous phase. In some embodiments, the three-phase emulsion may be formed from a first emulsion (referred to as a "primary" emulsion) having the internal aqueous phase and the intermediate hydrocarbon phase, and a second emulsion (referred to as a "secondary" emulsion) having the external aqueous phase and the first emulsion as the internal phase. Thus, as described in the disclosure, the primary emulsion may include the internal aqueous phase, the secondary emulsion may include the external aqueous phase, and the hydrocarbon phase of the primary emulsion may separate the internal aqueous phase and the external aqueous phase. The three-phase emulsion may also include nanometer-sized (that is, sizes in the range of about one nanometer (nm) to about 100 nm) or micrometer-sized (that is, sizes in the range of about one micrometer (μm) to about 100 micrometers) particles to form a solid-stabilized emulsion (also referred to as a "Pickering emulsion").

The primary emulsion used to form the three-phase emulsion may be a water-in-oil (w/o) emulsion (also referred to as an "invert" emulsion) having an internal aqueous phase and a hydrocarbon as the external phase (also referred to as the "continuous" phase). The aqueous internal phase of the primary emulsion may include water, a breaker, and an ester. The water of the aqueous internal phase may include fresh water or a brine. In some embodiments, the water of the aqueous internal phase may include a brine of inorganic salts. In some embodiments, the breaker may include oxidizing agents, enzymes, acids, and any combination thereof. In some embodiments, the breaker may include sodium peroxide, ammonium peroxide, magnesium peroxide, and the like. In some embodiments, the breaker may include sodium chlorite, sodium hypochlorite, sodium bromate, sodium persulfate, ammonium persulfate, encapsulated sodium persulfate, potassium persulfate, ammonium persulfate and the like. In some embodiments, the ester of the internal aqueous phase may include lactate, acetate, or other suitable esters.

As discussed infra, the hydrocarbon external phase of the primary emulsion may include a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof.

The primary emulsion may be formed using a hydrophobic emulsifier having a hydrophile-lipophile balance (HLB) indicative of hydrophobicity (for example, an HLB value less than about 6). In some embodiments, the hydrophobic emulsifier may be sorbitan monooleate (having an HLB value in the range of about 4 to about 5) or polyethylene dipolyhydroxystearate (having an HLB value in the range of about 5 to about 6). In other embodiments, the hydrophobic emulsifier may be a tall oil fatty acid (having an HLB value in the range of about 3.5 to about 4.5), such as, for example, oleic acid.

The secondary emulsion used to form the three-phase emulsion may be an oil-in-water (o/w) solid-stabilized emulsion having the primary emulsion as the internal phase and an aqueous external phase. The aqueous external phase may include water, a fracturing fluid, and a proppant. The water of the aqueous internal phase may include fresh water or a brine. In some embodiments, the water of the aqueous internal phase may include a brine of inorganic salts.

The fracturing fluid used in the primary emulsion may include a fracturing polymer. In some embodiments, the fracturing polymer may be guar, hydroxypropylguar, carboxymethylhydroxypropylguar, carboxymethyl guar, carboxymethylcellulose, carboxymethylhydroxy-ethylcellulose, and any combination thereof. In some embodiments, the fracturing fluid may include a gelling agent. Such gelling agents may include, for example, galactomannan gums, modified or derivative galactomannan gums, and cellulose derivatives. In other embodiments, the fracturing fluid may include other suitable natural or synthetic polymers known in the art.

The secondary emulsion may be formed using a hydrophilic emulsifier having a HLB indicative of hydrophilicity (for example, an HLB value of greater than 8). In some embodiments, the hydrophilic emulsifier may be a polysorbate. In some embodiments, the hydrophilic emulsifier is Tween® manufactured by Croda International of Snaith, United Kingdom. In some embodiments, the hydrophilic emulsifier is Tween® 20 (having an HLB value in the range of about 16 to about 17) manufactured by Croda International of Snaith, United Kingdom. In other embodiments, the hydrophilic emulsifier may be nonylphenol ethoxylate, a seed oil based surfactant, or a specialty alkoxylate, each of which may be obtained from Dow Chemicals of Midland, Mich., USA.

In some embodiments, the secondary emulsion includes nanometer-sized or micrometer-sized particles to form a solid-stabilized emulsion. In some embodiments, the nanometer or micrometer-sized particles are polylactate particles. In some embodiments, the polylactate particles may be micrometer-sized polylactide resin particles. In some embodiments, the polylactide resin may be BioVert®, BioVert® H150, or BioVert® NWB manufactured by Halliburton of Houston, Tex., USA.

In some embodiments, the three-phase emulsion may include a buffering agent to maintain a pH of the three-phase emulsion. In some embodiments, the buffering agent may be BA-20™ buffering agent manufactured by Halliburton Company of Houston, Tex., USA. In some embodiments, the pH of the three-phase emulsion may be about 6.5.

The three-phase emulsion may be formed from the primary emulsion and the secondary emulsion, such that the secondary emulsion has an internal phase that includes the primary emulsion and the external aqueous phase described supra. After formation of the three-phase emulsion from the primary emulsion and secondary emulsion, the aqueous internal phase of the primary emulsion and the aqueous external phase of the secondary emulsion are separated by a hydrocarbon phase (that is, the hydrocarbon external phase of the primary emulsion). As mentioned supra, the hydrocarbon phase of the three-phase emulsion may include a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof.

Embodiments of the three-phase emulsion may be used in an environment having a basic pH in the range of about 8 to about 12 and a temperature in the range of about 150° F. to about 300° F. In such embodiments, the emulsion may break at an acidic pH of about 5 or less. Embodiments of the three-phase emulsion may have a viscosity in the range of about 15 centipoise (cP) to about 50 cP at 511 inverse seconds ($s^{-1}$) at 77° F. In some embodiments, the three-phase emulsion may have a flash point of about 200° C. or greater.

In some embodiments, the viscosity of the emulsion may be varied by varying the oil-water ratio (OWR) of the emulsion. For example, the viscosity of the three-phase emulsion may be increased by increasing the OWR. In some embodiments, the OWR of the three-phase emulsion may be in the range of about 10:90 to about 40:60. In some embodiments, the three-phase emulsion may have an OWR of 10:90.

FIG. 1 is a schematic diagram 100 illustrating the components and formation of the three-phase emulsion in accordance with embodiments of the disclosure. As shown in FIG. 1, an aqueous phase 102 of a breaker and an ester and a hydrophobic emulsifier in a hydrocarbon phase 104 are blended in a high shear blender (for example, a blender having a mixing speed of at least 11,500 revolutions-per-minute (RPM)) to form a water-in-oil emulsion (that is, the primary emulsion 106) used to form the three-phase emulsion. The primary emulsion 106 is shown as an alternative depiction in block 110.

To prepare an oil-in-water emulsion having the primary emulsion as the internal phase, a fracturing fluid, a proppant, an emulsifier, and solid stabilizing particles in an aqueous phase 112 and the primary emulsion 106 are blended in a low shear blender (for example, a blender having a mixing speed of less than 1000 RPM) to form a secondary emulsion 114 and produce the three-phase emulsion 116. As shown in FIG. 1, the aqueous phase 112 and the primary emulsion 106 form the secondary emulsion 114 having the primary emulsion 106 as the internal phase, such that the hydrocarbon phase 104 of the primary emulsion 106 separates the aqueous phases 102 and 112.

Figure 2:
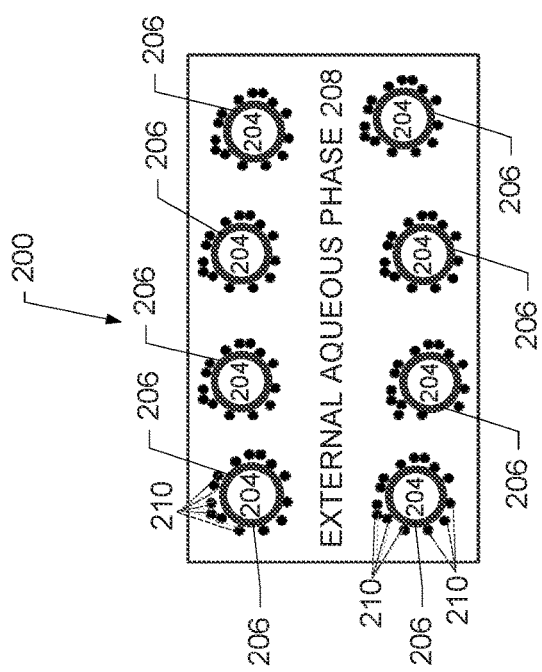
FIG. 2 is a schematic diagram depicting a three-phase emulsion in accordance with embodiments of the disclosure.

FIG. 2 is a schematic diagram of another depiction of the three-phase emulsion 200 illustrating the solid-stabilized properties of the three-phase emulsion in accordance with embodiments of the disclosure. As shown in FIG. 2, the 3-phase emulsion 200 may include an internal aqueous phase 204 that includes a breaker and an ester, a hydrocarbon phase 206, and an external aqueous phase 208 that includes the fracturing fluid and the proppant. As shown in FIG. 2, the internal aqueous phase 204 and the hydrocarbon phase 206 may be stabilized by nanometer-sized or micrometer-sized particles 210 (numbering of all the particles 210 in FIG. 2 is omitted for clarity). As described supra, the particles 210 may be nanometer-sized or micrometer-sized particles to enable formation of a solid-stabilized emulsion.

A process for hydraulic fracturing of a hydrocarbon-bearing formation may include preparing the three-phase emulsion at the surface of a wellsite in the manner described in the disclosure. The three-phase emulsion may be delivered (for example, pumped downhole as a fluid pill) to a target zone in a hydrocarbon-bearing formation using techniques known in the art. As discussed supra, the three-phase emulsion may enable delivery to the target zone to induce fractures in the target zone without premature breaking of the fracturing fluid and ensure placement of all or substantially all of the proppant inside the induced fractures before activation of the breaker of the three-phase emulsion. In some embodiments, the delayed breaking of the fracturing fluid provided by the three-phase emulsion may also enable longer pumping times for delivery of the three-phase emulsion to the target zone.

In some embodiments, the delivery of the three-phase emulsion is performed in a basic pH (for example, a pH in the range of about 8 to about 12) environment to ensure stability of the three-phase emulsion. As the three-phase emulsion encounters elevated temperatures (for example, temperatures in the range of about 150° F. to about 300° F.), the esters and polylactate may hydrolyze and produce a corresponding acid. As the pH decreases and becomes acidic, the emulsifiers of the three-phase emulsion may deactivate, resulting in breakage of the emulsion. The fracturing fluid in the outer aqueous phase and the breaker in the internal aqueous phase released from the broken emulsion may react to break the fracturing fluid. Thus, the initial basic pH environment and transition to an acidic pH provides an additional control over the initiation of the reaction between the fracturing fluid and the breaker to further prevent premature breaking of the fracturing fluid and enable optimal placement of the proppant in the induced fractures. In addition to the advantages described supra, use of the three-phase emulsion for hydraulic fracturing leaves the target zone water wet after breakage of the emulsion and fracturing fluid and eliminates the use of a post-fracturing acid flush due to the in situ emulsion and fracturing fluid breakage. Additionally, the post-fracturing clean-up of equipment used in the fracturing process may be easier due to the aqueous base of the external phase of the three-phase emulsion.

EXAMPLES

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

The following non-limiting example of a three-phase emulsion was prepared and evaluated against a linear gel sample without formation as a three-phase emulsion. The linear gel sample was prepared with a sodium thiosulfate breaker and hydroxylpropyl guar (HPG) as a fracturing fluid. The pH of the sample was maintained using BA-20™ buffering agent manufactured by Halliburton Company of Houston, Tex., USA. The composition of the linear gel sample is shown in Table 1:

TABLE 1

Formulation of Linear Gel Sample

| Component | Quantity |
| --- | --- |
| Water, liter (L) | 1 |
| KCl, parts per thousand by mass (ppt) | 20 |
| HPG, ppt | 20 |
| Buffer, BA-20 ™, gallon per thousand (gpt) | To 6.5 pH |
| Gel Stabilizer, Sodium Thiosulfate, ppt | 10 |
| Breaker, Sodium Persulfate, ppt | 0.5 |

The preparation of the linear gel may be the same as the preparation of "Part B" described infra. The initial viscosity of the linear gel sample was measured as 25 cP at 511 s$^{-1}$ at 77° F. After measuring the initial viscosity, the linear gel sample was heated in an oven at 200° F. in a pressurized aging cell at a pressure of about 300 psi. The viscosity of the linear gel sample was measured after 2 hours and after 4 hours. The viscosities (including the initial viscosities) were measured at 511 s$^{-1}$ at 77° F. The measured viscosities of the linear gel sample are shown in Table 2:

TABLE 2

Viscosity of Linear Gel Sample

| Measurement | Viscosity (cP) |
| --- | --- |
| Initial Viscosity | 25 |
| Viscosity after 2 hours | 17 |
| Viscosity after 4 hours | 8 |

The example three-phase emulsion was prepared in accordance with the techniques described supra. The primary emulsion (that is, the water-in-oil emulsion) used to form the example three-phase emulsion was prepared using a high speed mixer at a mixing speed of 11,500 revolutions-per-minute (RPM). The aqueous phase of the primary emulsion (referred to as "Part A") was formed from a KCl brine, N-Flow 408™ filter cake breaker manufactured by Halliburton of Houston, Tex., USA, and a sodium persulfate breaker. The oil phase was formed from diesel. The emulsifier used in the primary emulsion was EZ MUL® NT emulsifier manufactured by Halliburton of Houston, Tex., USA. The pH of the primary emulsion was 11.

The composition of the primary emulsion used to form the example three-phase emulsion is shown in Table 3:

TABLE 3

Formulation of Example Primary Emulsion (Part A)

| Products | Quantity |
| --- | --- |
| BASE OIL, Diesel, barrels (bbl) | 0.60 |
| EZ MUL ® NT, parts per billion by mass (ppb) | 11 |
| Lime, ppb | 1.5 |
| N-Flow 408 ™, milliliters (ml) | 70 |
| KCl brine (20K ppm), ppb | 0.30 |
| Breaker, Sodium persulfate, ppt | 0.5 |

The secondary emulsion (that is, the oil-in-water emulsion) used to form the example three-phase emulsion was formulated using the linear gel described supra as the fracturing fluid component. The fracturing fluid linear gel (referred to as "Part B") was prepared by mixing water with KCl using an overhead stirrer at 500 RPM. HPG was added at a rate slow enough to avoid fish eye formation.

After addition of the HPG, the mixture was then stirred for 5 minutes, and BA-20™ buffering agent and sodium thiosulfate gel stabilizer were added. The fracturing fluid linear gel formulation was stirred for an additional 30 minutes to ensure hydration of the HPG. The pH of the secondary emulsion aqueous phase (Part B) was 6.5.

The three-phase emulsion was then prepared by adding 25 ml of Tween® 20 to 1 liter of Part A under continuous stirring by an overhead stirrer at 500 RPM. After stirring for 2 minutes, 50 grams of BioVert® H150 polylactide resin was added to the Part A-Tween® 20 mixture. This mixture was then stirred for 5 minutes, after which the stirring speed was increased to 1000 RPM. Next, 350 ml of Part B was added under continuous stirring. The final mixture was then stirred for 10 minutes to produce the example three-phase emulsion. The viscosity of the example three-phase emulsion was measured as 25 cP at 511 s$^{-1}$ at 77° F.

The example three-phase emulsion was heated in an oven for 8 hours at 200° F. in a pressurized aging cell. The viscosity of the example three-phase emulsion was measured at 2 hours, 4 hours, 6 hours, and 8 hours. The viscosities were measured at 511 s$^{-1}$ at 77° F. The integrity of the example three-phase emulsion was also observed at the measurement periods. The measured viscosities of the example three-phase emulsion, and the observed in are shown in Table 4:

TABLE 4

Viscosity of Example Three-phase Emulsion

| Measurement | Viscosity (cP) | Emulsion Integrity |
|---|---|---|
| Initial Viscosity | 25 | Intact |
| Viscosity after 2 hours | 23 | Intact |
| Viscosity after 4 hours | 22 | Intact |
| Viscosity after 6 hours | 19 | Intact |
| Viscosity after 8 hours | 5 | Broken |

As indicated by the viscosity values and observations shown in Table 4, the three-phase emulsion remained intact for up to 6 hours without any significant reduction in viscosity. After 8 hours, the three-phase emulsion destabilized and the linear gel was broken, as indicated by the decreased viscosity of 5 cP. The pH of the broken emulsion was 3.5. As shown by the results in Table 4, the example three-phase emulsion provided control over breaking of the fracturing fluid at elevated temperatures for a period of up to 6 hours. In contrast, as shown by the viscosity values in Table 2, the linear gel without formulation in a three-phase emulsion began breaking at just 2 hours and was broken after 4 hours.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. An emulsion for hydraulic fracturing of a formation, the emulsion comprising:
    a first aqueous phase comprising a breaker and an ester;
    a second aqueous phase comprising a fracturing fluid and a proppant; and
    a hydrocarbon phase separating the first aqueous phase and second aqueous phase, wherein the emulsion is a solid-stabilized emulsion stabilized by a plurality of polylactate particles, wherein the emulsion has a viscosity of at least 19 centipoise (cP) and is intact for at least 6 hours at a temperature of 200° F.

2. The emulsion of claim 1, wherein the first aqueous phase and hydrocarbon phase are stabilized by a hydrophobic emulsifier.

3. The emulsion of claim 2, wherein the hydrophobic emulsifier comprises sorbitan monooleate, polyethylene dipolyhydroxystearate, or a tall oil fatty acid.

4. The emulsion of claim 1, wherein the second aqueous phase and hydrocarbon phase are stabilized by a hydrophilic emulsifier.

5. The emulsion of claim 4, wherein the hydrophilic emulsifier comprises a polysorbate, a nonylphenol ethoxylate, a seed oil-based surfactant, or an alkoxylate.

6. The emulsion of claim 1, wherein the hydrocarbon phase comprises a fractional distillate of crude oil, a saturated hydrocarbon, an unsaturated hydrocarbon, a branched hydrocarbon, a cyclic hydrocarbon, a fatty derivative of an acid, an ester, an ether, an alcohol, an amine, an amide, or an imide, and any combination thereof.

7. The emulsion of claim 1, wherein the first aqueous phase comprises a brine comprising at least one inorganic salt.

8. The emulsion of claim 1, wherein the breaker of the first aqueous phase comprises sodium chlorite, sodium hypochlorite, sodium bromate, sodium persulfate, ammonium persulfate, encapsulated sodium persulfate, potassium persulfate, ammonium persulfate, sodium peroxide, ammonium peroxide, or magnesium peroxide.

9. The emulsion of claim 1, wherein the second aqueous phase comprises a brine comprising at least one inorganic salt.

10. The emulsion of claim 1, wherein the fracturing fluid comprises guar, hydroxypropylguar, carboxymethylhydroxypropylguar, carboxymethylguar, carboxymethylcellulose, carboxymethylhydroxy-ethylcellulose, and any combination thereof.

11. The emulsion of claim 1, wherein the emulsion has an oil-water ratio (OWR) in the range of 10:90 to 40:60.

12. The emulsion of claim 1, wherein each of the plurality of polylactate particles have a diameter in the range of 1 micrometer (μm) to 100 micrometers.

* * * * *